United States Patent
Yu et al.

(10) Patent No.: US 9,446,385 B2
(45) Date of Patent: Sep. 20, 2016

(54) SURFACE DEPOSITION-TYPE HONEYCOMB CATALYST FOR FLUE GAS DENITRIFICATION AND PREPARATION METHOD THEREOF

(75) Inventors: Jian Yu, Beijing (CN); Feng Guo, Beijing (CN); Juan Yang, Beijing (CN); Yin Wang, Beijing (CN); Li Dong, Beijing (CN); Shiqiu Gao, Beijing (CN); Guangwen Xu, Beijing (CN)

(73) Assignee: Institute of Process Engineering, Chinese Academy of Sciences (CN)

( * ) Notice: Subject to any disclaimer, the term of this patent is extended or adjusted under 35 U.S.C. 154(b) by 200 days.

(21) Appl. No.: 14/123,643

(22) PCT Filed: Sep. 23, 2011

(86) PCT No.: PCT/CN2011/001617
§ 371 (c)(1),
(2), (4) Date: Dec. 3, 2013

(87) PCT Pub. No.: WO2012/162864
PCT Pub. Date: Dec. 6, 2012

(65) Prior Publication Data
US 2014/0113802 A1    Apr. 24, 2014

(30) Foreign Application Priority Data
Jun. 3, 2011 (CN) .......................... 2011 1 0149575

(51) Int. Cl.
*B01J 23/22* (2006.01)
*B01J 37/00* (2006.01)
(Continued)

(52) U.S. Cl.
CPC ............ *B01J 21/16* (2013.01); *B01D 53/8628* (2013.01); *B01J 23/30* (2013.01); *B01J 35/023* (2013.01);
(Continued)

(58) Field of Classification Search
CPC ........ B01J 21/063; B01J 23/22; B01J 23/30; B01J 37/00; B01J 37/0036; B01J 37/04; B01J 37/08; B01J 37/088; B01J 37/14
USPC ......................................... 502/309, 312, 350
See application file for complete search history.

(56) References Cited

U.S. PATENT DOCUMENTS 4,140,654 A * 2/1979 Yoshioka et al. ............... 502/63
4,466,947 A * 8/1984 Imanari et al. ............ 423/239.1
(Continued)

FOREIGN PATENT DOCUMENTS

| CN | 1443595 | * | 9/2003 | ............. B01D 53/56 |
| CN | 1628906 | | 6/2005 | |
| CN | 102039205 | | 5/2011 | |

*Primary Examiner* — Patricia L Hailey
(74) *Attorney, Agent, or Firm* — Jack Schwartz & Associates, PLLC

(57) ABSTRACT

This invention relates to the cleaning of flue gas released from various combustion processes, particularly a surface deposition $NH_3$—SCR honeycomb catalyst and its preparation method. The catalyst is composed of framework material, $TiO_2$, $V_2O_5$ and $WO_3$, wherein the framework material is composed of clay, coal ash, mineral waste residue or their mixture. The mass fractions for framework material, $TiO_2$, $V_2O_5$, and $WO_3$ are 60 wt. % to 80 wt. %, 13 wt. % to 33 wt. %, 1 wt. % to 5 wt. %, and 0.1 wt. % to 2 wt. %, respectively. The nano $V_2O_5$—$WO_3$—$TiO_2$ particles were deposited on the surface of particle pore or honeycomb, and the performance of the catalyst could be greatly improved.

10 Claims, 1 Drawing Sheet

(51) Int. Cl.
  *B01J 37/04* (2006.01)
  *B01J 37/08* (2006.01)
  *B01J 37/14* (2006.01)
  *B01J 21/16* (2006.01)
  *B01J 23/30* (2006.01)
  *B01J 35/04* (2006.01)
  *B01J 35/02* (2006.01)
  *B01J 37/02* (2006.01)
  *B01D 53/86* (2006.01)

(52) U.S. Cl.
  CPC ............ *B01J 35/04* (2013.01); *B01J 37/0018* (2013.01); *B01J 37/0201* (2013.01); *B01D 2255/20707* (2013.01); *B01D 2255/20723* (2013.01); *B01D 2255/20776* (2013.01)

(56) References Cited

U.S. PATENT DOCUMENTS

| | | |
|---|---|---|
| 5,198,403 A | 3/1993 | Brand et al. |
| 2005/0137082 A1* | 6/2005 | Nojima et al. ............... 502/312 |
| 2007/0207078 A1* | 9/2007 | Nochi et al. ............... 423/239.1 |

* cited by examiner

SURFACE DEPOSITION-TYPE HONEYCOMB CATALYST FOR FLUE GAS DENITRIFICATION AND PREPARATION METHOD THEREOF

TECHNICAL FIELD

This invention relates to the cleaning of flue gas from various combustion utilities using a honeycomb catalyst. Particularly, this invention involves a honeycomb catalyst for selective catalytic reduction (SCR) made by surface deposition and its preparation process.

BACKGROUND OF THE INVENTION

A number of occasions that destroy the ecosystem of the earth, such as acid rain and photochemical smog, are always caused by excessive emission of NOx, which is one of the main factors of air pollution. Therefore, the control of NOx emission becomes a key and difficult problem of atmospheric environment protection in the world. In China, for example, the NOx emission from combustion of fossil fuels, such as coal, petroleum and natural gas, takes up 90% of the total NOx emissions. Among them, 70% of the NOx emission is caused by coal combustion, which mainly comes from the power plant, industrial boiler and kiln. However, the control measures to these emissions, such as NOx from power plants and industrial boilers, are not mature enough. Meanwhile, lots of countries have established rigorous NOx emission standards to control the NOx concentration in atmosphere. For example, in China, the "Atmospheric Pollutants of Power Plant Emission Standard" (GB-13223-2003), which was applied to power plants with scale above 65 t/h of steam production capacity, confined the maximum acceptable emission concentration of NOx in flue gas. The NOx emission reduction has also been referred to in the agenda of "the 12$^{th}$ Five-Year plan" of China. Therefore, the denitration (DeNOx) of flue gas will be the key field in the atmospheric pollution control in future.

At present, the selective catalytic reduction (SCR) of NOx by $NH_3$ is one of the most important methods to decrease the NOx emission of flue gas, to be specific, 95% of flue gas is processed by this method. The main $NH_3$—SCR reactions can be illustrated as follows.

$$4NH_3 + 4NO + O_2 = 4N_2 + 6H_2O \quad (1)$$

$$4NH_3 + 2NO_2 + O_2 = 7N_2 + 6H_2O \quad (2)$$

The core of this technology is to develop DeNOx catalyst with high performance. In China, the production technology for the so-called medium-temperature DeNOx catalyst is originally from technical import and in turn self-development. The catalysts are based on the vanadium-tungsten-titanium oxides compound, which takes up 80% in weight. Therefore, the price of DeNOx catalysts is high.

Besides power plants, there are a large number of industrial combustion furnaces in China, including more than 500 thousands of industrial boilers consuming more than 400 million tons of coal per year, 180 thousands of calcination furnaces and rotary kilns consuming 0.16 billion tons of coal per year, and thousands of sintering furnaces with coal consumption of 70 million tons per year. However, the control of NOx in flue gas from these industrial furnaces is different from that from power plants. The capacity of industrial boilers is often smaller than 100 MW so that the cost of DeNOx system is more expensive per unit. For example, the cost of DeNOx catalyst for a heating boiler of 75 MW is usually about 200 RMB/h for reducing its flue gas NOx concentration to 50 mg/Nm$^3$. Meanwhile, for these industrial boilers, the temperature window between air preheater and economizer is always in the range of 250-350° C., which is lower than that of power plants. Therefore, the conventional DeNOx catalyst is hardly adapted to the flue gas conditions of such industrial furnaces. On other hand, a large portion of industrial furnaces employ fixed bed, moving bed or stoker boiler, which have low dust in their flue gas (<10 g/m$^3$). With growing environmental concern, the emission standard of NOx for industrial boilers should be more stringent in the future.

Given the preceding special flue gas conditions of China, there is a strong need for cheap DeNOx catalyst with wide working temperature window because they can be applied to the flue gases of both power plants and industrial boilers.

Since the 1990s, various DeNOx catalysts, including noble metal catalysts, transition metal oxide catalysts, zeolite and active carbon catalysts have been reported in the literature. The commercialized catalyst eventually adopted manganese and vanadium oxides as its active components. The DeNOx catalysts invented by Chinese patents 200910077934.4, 200910087773, 200810020426.8 and US patents US 20080072575 A1 and US 20100284876 A1 showed good low temperature activity. However, they are prone to be deactivated in the existence of $SO_2$ and $H_2O$. Cheap materials were also used as the base material of DeNOx catalysts. The Chinese patents 201010100867.6, 201010523591.2 and 200810112624.7 proposed the use of slag as additive in extruding honeycomb DeNOx catalysts. Yang R. T. invented a type of catalyst using $TiO_2$ pillared bentonite to prepare cheap DeNOx catalyst (U.S. Pat. No. 6,521,559). The catalyst with 5 wt. % vanadium oxide shows good activity at 350° C. However, these catalysts hardly ensure the close interaction between active component and support, resulting in the low catalytic activity and high price of the catalysts.

SUMMARY OF THE INVENTION

The purpose of this invention is to provide a honeycomb DeNOx catalyst prepared by surface deposition method.

Another purpose of this invention is to provide a process for preparing a honeycomb DeNOx catalyst based on surface deposition method.

According to the present invention, the catalyst is composed of a honeycomb framework, $TiO_2$ as an active carrier, $V_2O_5$ and $WO_3$ as active components, wherein the honeycomb framework is composed of clay, coal ash or mineral waste residue, the active components are loaded on the active carrier and the active carrier is dispersed in the honeycomb framework; the mass fractions of these components are as follows: the framework: 60~80 wt. %; $TiO_2$: 13~33 wt. %; $WO_3$: 1~5 wt. %; $V_2O_5$: 0.1~2 wt. %.

Preferably, in the catalyst according to this invention, the oxides of transitional metals, such as Mn, Fe, Co, Nb, Ce, could also be added to promote the dispersion and stabilization of the active component.

According to one embodiment of the honeycomb DeNOx catalyst prepared by surface deposition method, the catalyst also includes glass fiber of 1~10 wt. % as molding promoter.

According to one embodiment of the honeycomb DeNOx catalyst prepared by surface deposition method, the clay is bentonite, kaolin or atlapulgite, and wherein the basic or alkaline oxides in the clay is lower than 2 wt. % and have a particle size of 10-100 nm.

According to another aspect of this invention, the catalyst preparation process includes the following steps:

(1) Preparing the composite catalyst of $V_2O_5$—$WO_3$—$TiO_2$-transition carrier (1-1) Preparing a Ti-precursor solution including surfactant, wherein the concentration of the solution is 0.1~5 mol/L and the surfactant of the solution is 1~5 wt %;

(1-2) Adding porous combustion and transition carrier (CTC) to the Ti-precursor solution prepared in (1-1) and stirring the mixture at 90~150° C. for 1~2 h during the reaction, the Ti precursor diffuses and nucleates into the transition carrier, resulting in the mass ratio of $TiO_2$ and carrier between 1:1~1:10;

(1-3) Adding tungsten precursor and vanadium precursor to the solution obtained in (1-2) and stirring the resulted solution at 90~150° C. for 1~10 h to undergo hydrolysis reaction, by which the composite catalyst of $V_2O_5$—$WO_3$—$TiO_2$-transition carrier is then obtained by separating the solid from the liquid, drying the separated solid and calcining the dried solid in inert atmosphere, wherein the loading amount of $V_2O_5$ is 1~5 wt. % with respect to the mass of $TiO_2$ and the loading amount of $WO_3$ is 1~10 wt. % with respect to the mass of $TiO_2$;

Alternatively, the preceding step (1-3) may be implemented by the following two successive steps.

(1-3) Adding tungsten precursor to the solution obtained in (1-2), keeping the mass ratio of the loaded $WO_3$ to $TiO_2$ within the range of 0.01~0.1 and stirring the solution at 90~150° C. for 1~10 h to undergo hydrolysis reaction, by which the composite material of $WO_3$—$TiO_2$-transition carrier is then obtained by separating the solid from the liquid, drying the separated solid and calcining the dried solid in inert atmosphere, wherein the loading amount of $WO_3$ is 1~10 wt. % with respect to the mass of $TiO_2$;

(1-4) Adding the $WO_3$—$TiO_2$-transition carrier obtained from the above (1-3) to the solution containing vanadium precursor, keeping the mass ratio of $V_2O_5$ to $TiO_2$ within the range of 1~5% and stirring the solution at 20~100° C. for 1~6 h so that hydrolysis reaction occurs, by which the composite catalyst of $V_2O_5$—$WO_3$—$TiO_2$-transition carrier is then obtained by separating the solid from the liquid, drying the separated solid and calcining the dried solid in inert atmosphere, wherein the loading amount of $V_2O_5$ is 1~5 wt. % with respect to the mass of $TiO_2$.

(2) Preparing the honeycomb DeNOx catalyst by surface deposition method

Mixing the composite catalyst of $V_2O_5$—$WO_3$—$TiO_2$-transition carrier obtained from above step (1) with the molding promoter and water at room temperature. After kneading and extrusion processing, the resulting honeycomb is dried at room temperature and calcined under programmed heating to obtain the honeycomb catalyst, wherein the cheap material is in the range of 60~80 wt. %, $TiO_2$ in the range of 13~33 wt. %, $WO_3$ in the range of 1~5 wt. % and $V_2O_5$ in the range of 0.1~2 wt. %.

Based on the process for preparing the honeycomb catalyst of the present invention, the Ti precursor is one or more of $TiO_2$, $Ti(SO_4)_2$, $TiOSO_4$, titanate and metatitanic acid and preferably is one or more of $Ti(SO_4)_2$, $TiOSO_4$ and titanate.

Based on the process for preparing the honeycomb catalyst of the present invention, the tungsten precursor is one or more of tungsten ethoxide, ammonium tungstate, ammonium para-tungstate, ammonium meta-tungstate and sodium tungstate, and preferably is one or more of ammonium meta-tungstate, tungsten ethoxide and sodium tungstate.

Based on the process for preparing the honeycomb catalyst of the present invention, the vanadium precursor is one or two of $V_2O_5$, vanadyl acetylacetonate, ammonium meta-vanadate, vanadyl oxalate and vanadyl sulfate.

Based on the process for preparing the honeycomb catalyst of the present invention, wherein the porous CTC used in the step (1-2) is one of active carbon, granulated sugar, starch, peat, char and high polymer resin or microspheres.

Based on the process for preparing the honeycomb catalyst of the present invention, wherein the solvent for all above mentioned precursor liquids is one or more of water, ethanol, petroleum ether and toluene.

Based on the process for preparing the honeycomb catalyst of the present invention, wherein in the step (2) the drying process is performed at 50~150° C. and then the calcination process is performed in atmosphere at heating rate of 1~60° C./min to 500~700° C. for 1~10 h.

This cheaply priced DeNOx catalyst provided by the invention, which is suitable to be applied to the flue gas of power plants and industrial boilers, introduces the CTC into the framework by mixing the CTC as pore forming material to make the nano catalyst together as a composite support, which is then kneaded, extruded and calcined to prepare the honeycomb catalyst. Preferably, vanadium and tungsten precursors are selectively loaded on the surface of $TiO_2$ through the grafting method so as to maximize the interaction between the catalyst carrier and active component. Meanwhile, the nanoparticles of the catalyst are highly dispersed on the pore or surface of the honeycomb to obtain the high activity. Because of these, the catalyst of the invention has lower cost than the present available commercial catalyst and has wider working temperature range and better application adaptability.

According to one embodiment of this invention, the preparation method of the catalyst for this invention includes the following steps:

I. Preparing the $WO_3$—$TiO_2$/Transition-Carrier Composite Material (1) Dissolving Ti precursor in water to obtain the Ti precursor solution, and 5 wt. % of surfactants is added to obtain Ti precursor solution at 20~40° C.;

(2) Adding the combustion and transition carrier (CTC) into the Ti precursor solution obtained in (1) and stirring the mixture for 1~2 h at 20~40° C. to undergo diffusing of Ti precursor and one-step nucleation in the pores of the carrier, wherein the mass ratio of the theoretical yield $TiO_2$ to the carrier is 1:1~10:1;

(3) Increasing the reaction temperature to 90~150° C. and adding the tungsten precursor dropwise into the Ti precursor solution so as to initiate the co-hydrolysis of the tungsten and the Ti precursor at that temperature, thereby the compound of metatitanic acid and $WO_3$ being formed on the surface of transition carrier;

(4) Filtering the compound obtained in (3), drying the collected solid at 50~110° C. for 5~10 h and then calcining the dried compounded at 300~500° C. in inert atmosphere for 5~10 h so as to obtain the composite carrier containing $WO_3$—$TiO_2$ nanoparticles;

(5) Alternatively, the composite carrier material can also be obtained through equivolumetric impregnation of tungsten precursor onto titanium carrier.

II. Preparing $V_2O_5$—$WO_3$—$TiO_2$/Transition-Carrier Catalyst (1) Adding the composite carrier obtained from the above step 1 into the vanadium precursor solution, with pH value of the solution being in the range of 1~12, the loading amount of $V_2O_5$ is 1~5 wt. % of $TiO_2$;

(2) Alternatively, obtaining the composite catalyst by grafting method through mixing vanadium precursor and the composite carrier in the solvent at 30~150° C. for 3-10 h;

(3) Drying the products obtained from (1) or (2) of the step II at 50~100° C. for 5~10 h and calcining the dried material at 200~400° C. for 5-10 h in inert atmosphere so as to obtain the composite catalyst.

III. Preparing the Honeycomb Catalyst (1) Mixing the composite catalyst obtained from the step II with molding promoter, framework materials and adding water into the mixture to make the moisture content of the resulting mixture mud in the range of 20~60 wt. %;

(2) Extruding the mud obtained from (1) to form honeycomb catalyst after kneading and vacuum pugging process, wherein the extrusion pressure is about 5~20 MPa, and the sectional dimension of the honeycomb catalyst is 75*75 mm or 150*150 mm;

(3) Drying the honeycomb catalyst at room temperature for 10 h, drying the same with hot air of 50~100° C. for 5-10 h, drying the same at 80~150° C. with microwave for 1~5 h and calcining the same for 1~5 h at 400~700° C. with a temperature increasing rate of 1~10° C./min, thereby the honeycomb catalyst is obtained.

The present deNOx catalyst can overcome the problem that the conventional catalysts are prone to deactivate under the coexistence of $SO_2$ and $H_2O$ (steam) because the conventional catalysts are commonly prepared only through solid mixing and kneading impregnation of active component onto carrier, resulting in the low dispersion of active component and the existence of poly vanadium compounds in the catalyst to increase the oxidation activity of the catalyst. This would increase the oxidation of $SO_2$ in DeNOx of flue gas over the catalyst and in turn form sulfate to deactivate the catalyst. Meanwhile, the conventional catalysts have low surface areas and pore volumes so that they have also limited endurance to the possibly formed ammonium sulfate to make the catalyst easy deactivating in the gas containing $SO_1$ and $H_2O$. By contrast, the present invention disperses nano catalyst directly on the surface of the transition carrier, thereby ensures the active component to disperse at the largest extent. The present catalyst possesses the high dispersion of active component and large pore volume because of its introduction of combustible transition material into the honeycomb catalyst, which makes the catalyst have higher endurance to the possibly formed ammonium sulfate and thus the improved activity and stability.

Comparing with other traditional catalysts, the honeycomb catalyst of this invention for flue gas DeNOx and its preparation process based on surface deposition possesses the following advantages:

(1) The present preparation method realizes the selective loading of active components, thus maximizing the interaction between the active components and catalyst carrier so that the present catalyst has wider working temperature window;

(2) The particles of the nano catalyst are dispersed to the largest extent into the pores and on the surface of the catalyst through introduction of the combustion of transition carrier so that the active components are more effective to lead to the higher activity of the catalyst;

(3) The cost of the present catalyst is greatly reduced than the traditional ones, while the present catalyst can also be used in a wider working temperature window for more applications.

DESCRIPTION OF PREFERRED EMBODIMENTS

Embodiment 1

1. Preparation of Composite Carrier 100 g $TiOSO_4$ was dissolved into 150 mL water, and the mass concentration of $TiOSO_4$ in the resulting solution was about 4.1 mol/L. Then, 5 g Tween-20 was added into the solution, and the mass concentration of Tween-20 in the resulting solution was about 2 wt. %. After the addition of 25 g urea and 50 g active carbon (BET area: 450 $m^2/g$; particle size: 50-100 μm), the resulting mixture was stirred at 50° C. for 2 h, during which one-step nucleation of meta-titanic acid occurred in the pores and surfaces of active carbon particles, and the mass ratio of the formed $TiO_2$ and carrier was 1:1. The suspension was stirred at 90° C. for 1 h, during which 7.5 g of ammonium meta-tungsten was added dropwise. The suspension was filtered and the filter cake was washed to the neutral pH. The filter cake was dried at 100° C. for 8 h, then the temperature of the filter cake was increased to 500° C. with a rate of 5° C./min. The filter cake was heated at 500° C. for 5 h to yield 100 g of composite carrier containing powder of nano titanium and tungsten oxides. Characterization of the composite carrier with XRD showed that the carrier possessed typical anatase of $TiO_2$, and the composite carrier showed strong diffraction peak above 1600 at 2θ=26°. Characterization of the composite carrier with TEM showed the particle size of 15~20 nm. Characterization of the composite carrier with XRF showed that the carrier was made of $TiO_2$ by about 48 wt %, carbon by about 47 wt. % and tungsten oxides by about 5 wt %.

2. Preparation of Composite Catalyst 100 g composite carrier, 1.4 g vanadyl acetylacetonate and 100 mL dehydrated toluene were added to a high pressure reactor. The mixture was stirred at 150° C. for 10 h, then the solvent was evaporated off to obtain a solid. The solid was dried at 80° C. and then dried in a nitrogen atmosphere at 400° C. to obtain the composite catalyst. The loading amount of $V_2O_5$ is 2 wt % with respect to the mass of $TiO_2$ and the loading amount of $WO_3$ is 1 wt % with respect to the mass of $TiO_2$. The composite catalyst was composed of $TiO_2$ by 47 wt %, carbon by 47 wt. %, $WO_3$ by 5 wt. % and $V_2O_5$ by 1 wt. %.

3. Preparation of Honeycomb Catalyst 20 kg composite catalyst, 20 kg kaolin, 3 kg silica sol (20%) and 1 kg glass fiber were mixed. Then 25 kg water was gradually added to the mixture. The resulting mixture was efficiently stirred in a stirrer and the resulting mud was pugged for 3~4 time, extruded, dried in air at room temperature for 10 h and 80° C. for 8 h in oven, calcined at 500°

Figure 1:
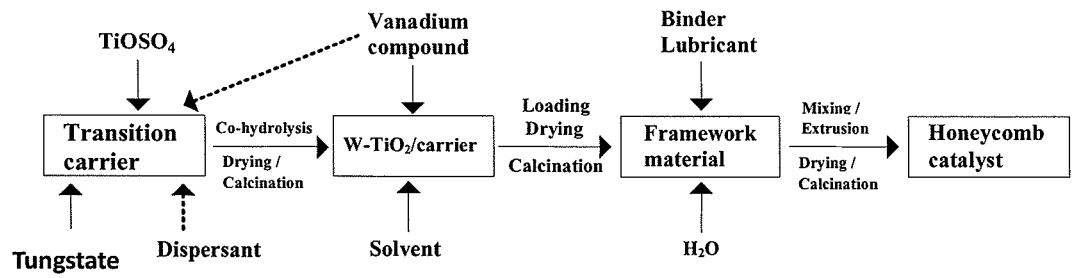
FIG. 1 shows the process for preparing the present DeNOx honeycomb catalyst using surface deposition method.
Figure 2:
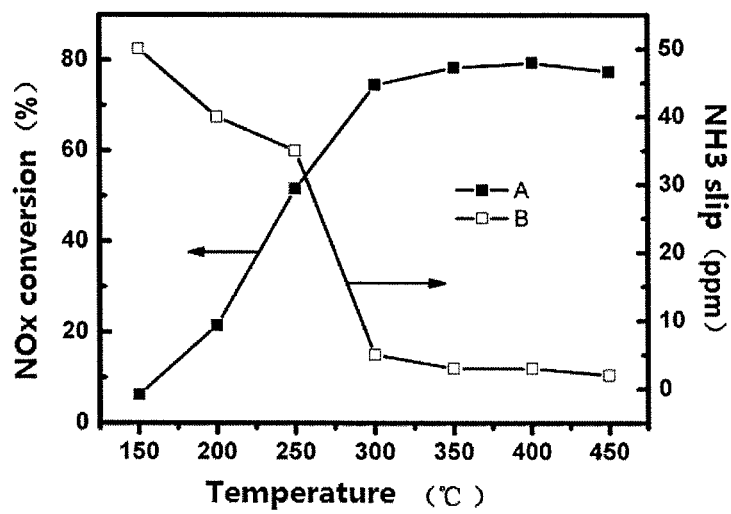
FIG. 2 shows the catalytic activity and $NH_3$ slip of the catalyst according to one embodiment of the present invention.
Figure 3:
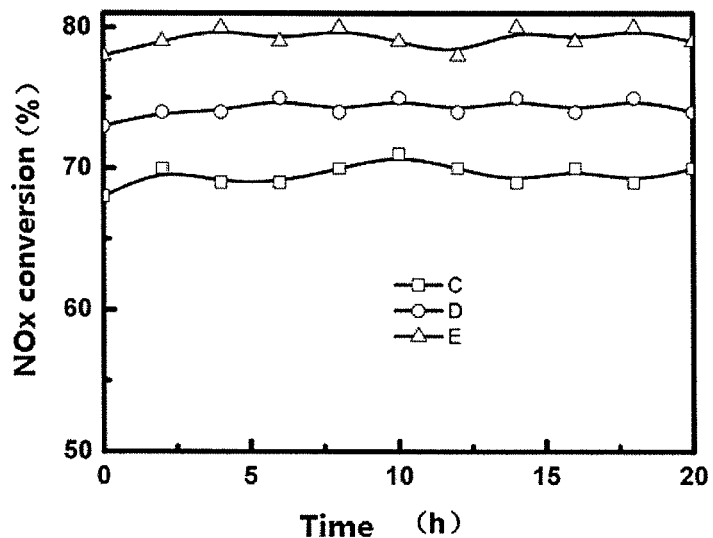
FIG. 3 shows the resistance to poisoning of $SO_2$ and $H_2O$ for the catalyst prepared according to the embodiment of the present invention in FIG. 2.

C. for 4 h and cooled to obtain the honeycomb catalyst with a section size of 75*75 mm and number of holes of 10*10. The honeycomb catalyst was comprised of kaolin (60 wt. %), $TiO_2$ (33 wt. %), $WO_3$ (2 wt. %) and $V_2O_5$ (0.1 wt %). Catalytic evaluation result for this honeycomb catalyst is shown in FIG. 1 as curve A. The ammonium slip at different temperatures of the honeycomb catalyst is shown in FIG. 1 as curve B, which indicates that the ammonium slip is less than 3 ppm when the temperature is higher than 300° C. The catalytic activity of the honeycomb catalyst at temperature higher than 300° C. is shown in FIG. 2. The DeNOx efficiency were 70%, 75% and 80% at 300° C. (curve C), 350° C. (curve D) and 400° C. (curve E), respectively.

Embodiment 2

1. Preparation of Composite Carrier 16 g $TiOSO_4$ was dissolved into 1000 mL water, and the mass concentration of $TiOSO_4$ in the resulting solution is about 0.1 mol/L, and 10 g PEG 2000 was added into the solution and its concentration was about 1 wt. %. After addition of 50 g urea, the suspension was stirred at 50° C. until the solid was dissolved, then 80 g carbon black (BET area: 200 $m^2/g$; particle size: 2 μm) was added to the solution, and the suspension was reacted for 1 h, during which one-step nucleation of meta-titanic acid occurred in the surface of black carbon particles, and the mass ratio of the formed TiO2 and carrier was 1:1. The reaction mixture was stirred at 150° C. for 10 h, during which 1.5 g sodium tungstate was added dropwise. The suspension was treated as in the Embodiment 1. Characterization of the composite carrier with XRD showed that the composite carrier possessed typical anatase of $TiO_2$, and the composite carrier showed strong diffraction peak above 1600 (intensity) at 2θ=26°. Characterization of the composite carrier with TEM showed the particle size of the composite carrier was about 5~10 nm. Characterization of the composite carrier with XRF showed that the composite carrier was made up of $TiO_2$ by about 10 wt. %, carbon by about 89 wt. % and tungsten oxides by about 1 wt. %.

2. Preparation of Composite Catalyst 100 g composite carrier prepared above, 5 g ammonium metavanadate and oxalic acid solution were mixed together to form a slurry. The solid was collected and dried at 80° C., which was then calcined at 400° C. in $N_2$ atmosphere to obtain the composite catalyst. The loading amount of $V_2O_5$ is 5 wt. % with respect to the mass of $TiO_2$ and the loading amount of $WO_3$ is 10 wt. % with respect to the mass of $TiO_2$. The resulting composite catalyst was composed of $TiO_2$ (10 wt. %), carbon (88.5 wt. %), $WO_3$ (1 wt. %) and $V_2O_5$ (0.5 wt. %).

3. Preparation of Honeycomb Catalyst 30 kg composite catalyst obtained from step 2, 20 kg bentoite, 3 kg alumina sol (20%) and glass fiber (1 kg) were mixed together. Then 5 kg water was added gradually to form a catalyst mud. The composite catalyst mud was extruded into honeycomb catalyst after being pugged 3-4 times. After being dried at room temperature for 10 h and at 80° C. for 8 h in an oven, the honeycomb catalyst was calcined at 500° C. for 4 h to obtain the final product. The section dimension and hole number of the final honeycomb catalyst were 75×75 mm and 10×10, respectively. The surface area and pore volume were 85 $m^2/g$ and 0.39 ml/g, respectively. The compressive strength of the crosswise and lengthways were 8 $kg/cm^2$ and 20 $kg/cm^2$, respectively. The final product was comprised of bentonite (80 wt. %), $TiO_2$ (19 wt. %), $WO_3$ (1.9 wt. %) and $V_2O_5$ (0.95 wt. %).

Embodiment 3

1. Preparation of Composite Carrier 800 g $TiOSO_4$ was dissolved in 1000 mL water, and the molar concentration of $TiOSO_4$ in the resulting solution was about 5 mol/L. Then 100 g Span-80 was added into the liquid, and the mass concentration of Span-80 in the resulting solution was about 5 wt. %. Then 50 g urea, 50 g ammonium tungstate and 7.2 g vanadyl sulfate were added and the mixture was stirred until a solution was. formed. 100 g polystyrene microballoon (BET area: 200 $m^2/g$; particle size: 2 μm) was added into the liquid subsequently, and the mixture was stirred for 10 h at 150° C. After the reaction is finished, the suspension was treated as in the step described in the Embodiment 1. The loading amount of $V_2O_5$ is 1 wt. % with respect to the mass of $TiO_2$ and the loading amount of $WO_3$ is 10 wt. % with respect to the mass of $TiO_2$. XRD Characterization showed that the composite carrier possessed typically anatase of $TiO_2$, and the composite carrier showed strong diffraction peak above 1600 (intensity) at 2θ=26°. TEM Characterization showed the particle size of composite carrier was about 5~10 nm. Characterization of the composite carrier with XRF showed the carrier was made up with $TiO_2$ by about 80 wt. %, carbon by about 11.2 wt. %, tungsten oxides by about 8 wt. % and vanadium oxides by about 0.8 wt. %.

2. Preparation of Honeycomb Catalyst 6.5 kg composite catalyst obtained in step 2, 10 kg coal ash, 3 kg alumina sol (20%) and 1 kg glass wool were mixed together, then 5 kg water was added gradually to form a catalyst mud. The catalyst mud was extruded into honeycomb catalyst after pugged 3~4 times. After being dried at room temperature for 10 h and at 80° C. for 8 h in oven, the honeycomb catalyst was calcined at 500° C. for 4 h to obtain the final product. The section dimension and hole number of the final catalyst were 75×75 mm and 10×10, respectively. The final product was composed of coal ash (63 wt. %), $TiO_2$ (35 wt. %), $WO_3$ (3.5 wt. %) and $V_2O_5$ (0.35 wt. %).

Embodiment 4

This preparation process is the same as the procedure of the Embodiment 3, wherein the tungsten precursor was added into the solution at 90° C. and then the mixture was stirred at 90° C. for 1 h and the vanadium precursor was added into the solution at 90° C. and then the mixture was stirred at 120° C. for 1 h. The loading amount of $V_2O_5$ is 1 wt. % with respect to the mass of $TiO_2$ and the loading amount of $WO_3$ is 10 wt. % with respect to the mass of $TiO_2$. The final product was composed of slag (75 wt. %), $TiO_2$ (20 wt. %), $WO_3$ (3 wt. %), $V_2O_5$ (1 wt. %) and $MnO_2$ (1 wt. %).

All parameters of catalyst preparation for the above different catalyst examples and the conventional catalyst were summarized in Table 1. As shown in this table, the compressive strength and surface area of the catalysts provided by this invention were similar to those of the conventional catalyst. Meanwhile, the temperature window of the catalytic activity for the present catalyst was wider than the conventional catalyst.

The experimental conditions for evaluation of the catalytic activity were as follows.

| | |
|---|---|
| $SO_2$ | 0.1 vol. % |
| $H_2O$ | 10 vol. % |
| NO | 0.06 vol. % |
| $NH_3$ | 0.048 vol. % |
| $O_2$ | 3 vol. % |
| $CO_2$ | 10 vol. % |
| CO | 0.05 vol. % |
| $N_2$ | Balance gas |
| GHSV | 3000 $h^{-1}$ |

TABLE 1

Performance parameters for different catalysts

| Embodiments | Composition (wt. %) | Surface area, Pore volume | Crosswise/ Lengthways compressive strength | NOx conversion, SO$_2$ oxidability, NH$_3$ slip at 250° C. | NOx conversion, SO$_2$ oxidability, NH$_3$ slip at 300° C. | NOx conversion, SO$_2$ oxidability, NH$_3$ slip at 350° C. |
|---|---|---|---|---|---|---|
| Example 1 | V$_2$O$_5$: 0.4%, WO$_3$: 2%, TiO$_2$: 33, Kaolin: 60% | 95 m$^2$/g, 0.79 mL | 8/20 kg/cm$^2$ | 55%, 0%, 1 ppm | 70%, 0.3%, 1 ppm | 75%, 0.4%, 1 ppm |
| Example 2 | V$_2$O$_5$: 0.95%, WO$_3$: 1.9%, TiO$_2$: 19%, Bentonite: 80% | 105 m$^2$/g, 0.59 mL | 9/25 kg/cm$^2$ | 65%, 0%, 1 ppm | 80%, 0.2%, 1 ppm | 80%, 0.3%, 1 ppm |
| Example 3 | V$_2$O$_5$: 0.35%, WO$_3$: 3.5%, TiO$_2$: 35%, Coal ash: 63% | 85 m$^2$/g, 0.69 mL | 10/25 kg/cm$^2$ | 60%, 0%, 2 ppm | 75%, 0.3%, 1 ppm | 80%, 0.5%, 1 ppm |
| Example 4 | V$_2$O$_5$: 1.0%, WO$_3$: 3.0%, TiO$_2$: 20%, MnO$_2$: 1% Slag: 75% | 80 m$^2$/g, 0.7 mL | 12/30 kg/cm$^2$ | 78%, 0%, 2 ppm | 80%, 0.3%, 1 ppm | 80%, 0.5%, 1 ppm |
| Commercial catalysts | V$_2$O$_5$: 1.0%, WO$_3$: 7.0%, TiO$_2$: 32%, Rests: 60% | 69 m$^2$/g, 0.25 mL | 8/20 kg/cm$^2$ | 50%, 0%, 1 ppm | 70%, 0.5%, 2 ppm | 75%, 1%, 3 ppm |

We claim:

1. A honeycomb catalyst for DeNOx prepared by surface deposition method, being composed of a honeycomb framework, TiO$_2$ as an active carrier, V$_2$O$_5$ and WO$_3$ as the active components, wherein the honeycomb framework is composed of clay, coal ash or mineral waste residue, the active components are loaded on the active carrier and the active carrier is dispersed in the honeycomb framework; mass fractions of the components are as follows: the framework: 63~80 wt. %; TiO$_2$ : 13~33 wt. %; WO$_3$ : 1~5 wt. %; V$_2$O$_5$ : 0.1~2 wt. %.

2. The catalyst according to claim 1, wherein the catalyst further includes glass fiber of 1~10 wt. % as molding promoter.

3. The catalyst according to claim 1, wherein the clay is bentonite, kaolin or atlapulgite, and the basic oxides in the clay is lower than 2 wt.% and has particle sizes of 10~100 nm.

4. A process for preparing a honeycomb catalyst for DeNOx based on the surface deposition method, includes:
   (1) Preparing composite catalyst of V$_2$O$_5$—WO$_3$—TiO$_2$-transition carrier
      (1-1) Preparing a Ti-precursor solution including surfactant, wherein the concentration of the solution is 0.1~5 mol/L and the surfactant of the solution is 1~5 wt %;
      (1-2) Adding porous combustion and transition carrier (CTC) to the Ti-precursor solution prepared in (1-1) and stirring at 90~150° C. for 1~2 h during the reaction, the Ti precursor solution diffuses and nucleates in the transition carrier, resulting in a mass ratio of formed TiO$_2$ and carrier between 1:1~1:10;
      (1-3) Adding tungsten precursor and vanadium precursor to the solution obtained in (1-2) and stirring a resulting solution at 90~150° C. for 1~10 h to undergo hydrolysis reaction, during which a composite catalyst for V$_2$O$_5$—WO$_3$—TiO$_2$-transition carrier is obtained by separating solid from liquid solvent, drying the separated solid and calcining the dried solid in inert atmosphere, wherein a loading amount of V$_2$O$_5$ is 1~5 wt. % with respect to a mass of TiO$_2$ and a loading amount of WO$_3$ is 1~10 wt. % with respect to the mass of TiO$_2$;
   Alternatively, step (1-3) is implemented by:
      (1-3a) Adding tungsten precursor to the solution obtained in (1-2), keeping the mass ratio of the loading amount of WO$_3$ to TiO$_2$ within the range of 0.01~0.1 and stirring the solution at 90~150° C. for 1~10 h to undergo hydrolysis reaction, during which the composite material of WO$_3$—TiO$_2$-transition carrier is obtained by separating the solid from the liquid solvent, drying the separated solid and calcining the dried solid in inert atmosphere, wherein the loading amount of WO$_3$ is 1~10 wt. % with respect to the mass of TiO$_2$;
      (1-3b) Adding the WO$_3$—TiO$_2$-transition carrier obtained from (1-3a) to a solution containing vanadium precursor, keeping the mass ratio of V$_2$O$_5$ to TiO$_2$ within the range of 1~5% and stirring the solution at 20~100° C. for 1~6 h so that the hydrolysis reaction occurs, during which the composite catalyst of V$_2$O$_5$—WO$_3$—TiO$_2$-transition carrier is obtained by separating the solid from the liquid solvent, drying the separated solid and calcining the dried solid in inert atmosphere, wherein the loading amount of V$_2$O$_5$ is 1~5 wt. % with respect to the mass of TiO$_2$;
   (2) Preparing Honeycomb DeNOx catalyst by surface deposition method,
   the honeycomb catalyst is formed by mixing the composite catalyst of V$_2$O$_5$—WO$_3$—TiO$_2$-transition carrier obtained from (1) with a molding promoter, framework materials, adding water into the mixture; after kneading and extrusion processing, drying the honeycomb catalyst at room temperature and calcining under programmed heating, wherein a framework material is in a range of 63~80 wt. %, TiO$_2$ in a range of 13~33 wt. %, WO$_3$ in a range of 1~5 wt. % and V$_2$O$_5$ in a range of 0.1~2 wt. %.

5. The process according to claim 4, wherein the Ti precursor solution is one or more of TiO$_2$, Ti(SO$_4$)$_2$, TiOSO$_4$, titanate and metatitanic acid; the tungsten precursor is one or more of tungsten ethoxide, ammonium tungstate, ammonium para-tungstate, ammonium meta-tungstate and sodium tungstate; the vanadium precursor is one or two of V$_2$O$_5$, vanadyl acetylacetonate, ammonium metavanadate, vanadyl oxalate and vanadyl sulfate; and the molding promoter is glass fiber.

6. The process according to claim 5, wherein the Ti precursor solution is one or more of Ti(SO$_4$)$_2$, TiOSO$_4$, titanate; the tungsten precursor is one or more of tungsten ethoxide, ammonium meta-tungstate and sodium tungstate; and in (1-3), before adding the tungsten precursor, the mass ratio of the loading amount of $WO_3$ to $TiO_2$ is kept within the range of 0.01~0.1.

7. The process according to claim 4, wherein the porous CTC used in (1-2) is one of active carbon, granulated sugar, starch, peat, char and high polymer resin or microspheres.

8. The process according to claim 4, wherein the solvent for the Ti precursor liquid, the tungsten precursor liquid and the vanadium precursor liquid is one or more of water, ethanol, petroleum ether and toluene.

9. The process according to claim 4, wherein in (2) the added water is 20~60 wt. % and then the calcination process is performed in atmosphere at heating rate of 1~60° C/min to 500~700° C. for 1~10 h.

10. The process according to claim 4, wherein in (1-3), before adding the tungsten precursor, the mass ratio of the loading amount of $WO_3$ to $TiO_2$ is kept within the range of 0.01~0.1.

\* \* \* \* \*